United States Patent [19]
Ohara et al.

[11] Patent Number: 5,880,254
[45] Date of Patent: *Mar. 9, 1999

[54] METHOD FOR PRODUCING POLYLACTIC ACID AND APPARATUS USED THEREFOR

[75] Inventors: Hitomi Ohara, Kyoto; Seiji Sawa, Ohtsu; Yasuhiro Fujii; Masahiro Ito, both of Kyoto; Masaaki Oota, Mukou, all of Japan

[73] Assignee: Shimadzu Corporation, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 676,411

[22] Filed: Jul. 8, 1996

[30] Foreign Application Priority Data

Jul. 25, 1995 [JP] Japan .................................. 7-188797

[51] Int. Cl.$^6$ .............................. C08G 63/88; C08G 3/90
[52] U.S. Cl. ....................... 528/483; 528/502 R; 528/503
[58] Field of Search ................................ 528/483, 502 R, 528/503

[56] References Cited

U.S. PATENT DOCUMENTS

| | | | |
|---|---|---|---|
| 3,565,869 | 2/1971 | DeProspero | 260/78.3 |
| 3,661,330 | 5/1972 | Yamada et al. | 241/65 |
| 5,117,008 | 5/1992 | Bhatia et al. | 549/274 |
| 5,218,087 | 6/1993 | Suzuki et al. | 528/503 |
| 5,359,027 | 10/1994 | Perego et al. | 528/354 |
| 5,496,923 | 3/1996 | Suizu et al. | 528/501 |
| 5,508,378 | 4/1996 | Ohara et al. | 528/354 |

FOREIGN PATENT DOCUMENTS

| | | |
|---|---|---|
| 0431188A1 | 6/1991 | European Pat. Off. . |
| 0500098A2 | 8/1992 | European Pat. Off. . |
| 0597155A1 | 5/1994 | European Pat. Off. . |
| 0644219A1 | 3/1995 | European Pat. Off. . |
| 0664309A2 | 7/1995 | European Pat. Off. . |

*Primary Examiner*—Frederick Krass
*Attorney, Agent, or Firm*—Birch, Stewart, Kolasch & Birch, LLP

[57] ABSTRACT

A method for producing a polylactic acid includes the steps of (a) crystallizing polylactic acid pellets obtainable by direct polymerization of lactic acid or ring-opening polymerization of lactide; and (b) removing low-molecular components having a weight-average molecular weight of 1,000 or less in the resulting crystallized, solid polylactic acid pellets by gasifying the low-molecular components to obtain polylactic acids with substantially no low-molecular components. In this method, an apparatus for removing low-molecular components in polylactic acid pellets includes a crystallizing means for maintaining a temperature between equal to or higher than a glass transition temperature of polylactic acid pellets and equal to or lower than the melting point thereof, while fluidizing the polylactic acid pellets; and a reactor for allowing a heated inert gas and/or heated air to pass through the resulting crystallized, solid polylactic acid pellets obtained by the crystallizing means.

10 Claims, 1 Drawing Sheet

METHOD FOR PRODUCING POLYLACTIC ACID AND APPARATUS USED THEREFOR

BACKGROUND OF THE INVENTION

1. Field of the Invention

The present invention relates to a method for producing polylactic acid pellets substantially containing no low-molecular components, such as lactide, and an apparatus used therefor.

2. Discussion of the Related Art

Polylactic acid is a biologically very safe polymer, and its degradated product, namely lactic acid, is absorbed in vivo. Having the above properties, polylactic acid is useful for medical purposes, including surgical sutures, sustained-release capsules in drug delivery systems, and reinforcing materials for bone fractures. Moreover, it is noted as a biodegradable plastic, because it is degraded under natural environmental conditions. It is also widely used for mono-axially and biaxially stretched films, fibers, extrusion products, and various other purposes.

Known methods for producing a polylactic acid are as follows: In one method, lactic acid is directly subject to dehydration condensation to give a desired product. In another method, a cyclic lactide of lactic acid, is first synthesized from lactic acids and then purified by such methods as crystallization, followed by ring-opening polymerization. Various procedures for synthesizing, purifying and polymerizing lactide are disclosed in U.S. Pat. No. 4,057,537, EP-A-261,572, *Polymer Bulletin*, 14, pp.491–495 (1985), *Makromol. Chem.*, 187, 1611–1628 (1986), and other chemistry literatures. Also, JP-B-56-14688 discloses a method for producing a polylactic acid comprising polymerizing a bimolecular cyclic diester, as an intermediate, using tin octylate or lauryl alcohol as a catalyst. Also, polylactic acid can be produced directly from lactic acid by the methods as described in JP-7-33861, JP-59-96123, and *The Proceedings of The Discussion on Macromolecules*, vol.44, pp.3198–3199. The polylactic acid thus obtained is pelletized into various forms, such as spheres, cubes, columns, and disrupted pieces, in a size of from a rice grain to a bean, to facilitate its handling in the forming process.

However, polylactic acid having a high molecular weight of from 100,000 to 500,000 has a high melting point of from 175° to 200° C. Conventionally, when the final polymer product of the above polylactic acid is taken out from the reactor in a molten state and heated to a temperature equal to or higher than its melting point, the polylactic acid undergoes decomposition and coloration. Moreover, a large amount of lactide is generated in the polymer by heating to the above-mentioned temperature range, presumably owing to the fact that a polymer-lactide equilibrium is shifted toward the lactide side at the above temperature.

These lactide and decomposition products thereof are liable to sublime during injection molding or spinning of the polylactic acid pellets used as a starting material and undesirably adhere to dice or nozzles, and thereby the operation is hampered. Furthermore, the lactide and the decomposition products lower the glass transition temperature and the melt viscosity of the polymer, thereby resulting in drastic deterioration of moldability and thermal stability.

In view of the above problems, various methods for removing low-molecular components of the polylactic acids have been proposed, including Japanese Patent Laid-Open No. 3-14829. This publication discloses that residual low-molecular components or low-molecular volatile components can be removed by keeping a polyester at a temperature between its melting point and 250° C. and under a reduced pressure of 5 mmHg or less. It further discloses that when the temperature is lower than its melting point, substantially no unchanged monomer components become volatile. In this method the low-molecular components are removed in a molten state, the polymer-lactide equilibrium is therefore shifted toward the lactide side, thereby resulting in the regeneration of the lactide in the product polymers. Therefore, this method has notable limitation in the removal of the low-molecular components.

Also, Japanese Patent Laid-Open No. 5-255488 discloses a method for increasing a molecular weight of a low-molecular weight lactic acid polymer, comprising the steps of heating the starting low-molecular weight lactic acid polymer having an individual particle size of from 5 $\mu$m to 5 mm at a temperature higher than its glass transition temperature and lower than its melting point, and carrying out condensation polymerization by dehydration reaction. However, in this method, the operation required about 240 hours according to the examples thereof, thereby making it impossible to carry out industrially. Moreover, this method was mainly intended to be applied to materials for medical use. Therefore, it has a feature of increasing the molecular weight without using a catalyst, and is never directed to reducing the low-molecular components.

SUMMARY OF THE INVENTION

Therefore, an object of the present invention is to provide a method for producing a polylactic acid substantially containing no low-molecular components, such as lactide, by efficiently removing volatile impurities, such as unchanged starting monomers even in a solid state, without increasing a molecular weight.

Another object of the present invention is to provide an apparatus used for the removing step of this method.

As a result of intense research in view of the above problems, the present inventors have found that by removing unchanged starting monomers and low-molecular components after crystallizing the polylactic acid pellets, polylactic acid free from coloration and decomposition can be produced. The present invention has been completed based upon this finding.

In one aspect, the present invention is concerned with a method for producing a polylactic acid, comprising the steps of:

(a) crystallizing polylactic acid pellets obtainable by direct polymerization of lactic acid or ring-opening polymerization of lactide; and (b) removing low-molecular components having a weight-average molecular weight of 1,000 or less in the resulting crystallized, solid polylactic acid pellets by gasifying the low-molecular components to obtain polylactic acids with substantially no low-molecular components.

In a preferred embodiment, it may further comprise the steps of:

(c) collecting the gasified low-molecular components removed in step (b); and (d) returning the low-molecular components to a polymerization step for producing polylactic acids as starting materials.

In another aspect, the present invention is concerned with an apparatus for removing low-molecular components in polylactic acid pellets, comprising:

a crystallizing means for maintaining a temperature between equal to or higher than a glass transition temperature of polylactic acid pellets and equal to or lower than the melting point thereof, while fluidizing the polylactic acid pellets; and a reactor for allowing a heated inert gas and/or heated air to pass through the resulting crystallized, solid polylactic acid pellets obtained by the crystallizing means.

BRIEF DESCRIPTION OF THE DRAWING

The present invention will become more fully understood from the detailed description given hereinbelow and the accompanying drawing which is given by way of illustration only, and thus, is not limitative of the present invention, and wherein.

Figure 1:
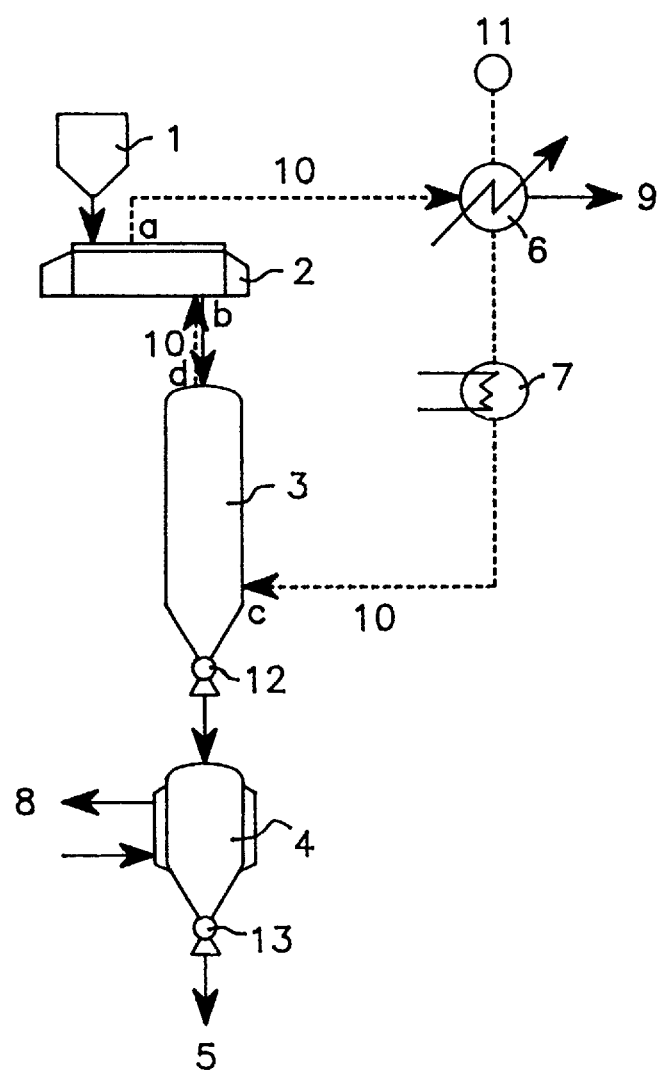
FIG. 1 is a schematic view of an apparatus for carrying out the method of the present invention.

The reference numerals in FIG. 1 denote the following: 1 is a feeder, 2 a crystallizer, 3 a hopper-type reactor, 4 a cooling device, 6 a condenser, 7 a heater, and 10 a flow path of an inert gas.

DETAILED DESCRIPTION OF THE PREFERRED EMBODIMENTS

In the present specification, the term "low-molecular components" refers to lactide as a starting material monomer and decomposed products of the lactide or polylactic acid, the low-molecular components having a weight-average molecular weight of 1,000 or less.

The polylactic acid pellets of the present invention may be produced either by direct polymerization of lactic acid or by ring-open polymerization of lactide, with a preference given to the ring-open polymerization of lactide from the viewpoint of obtaining those having high molecular weights.

In the case of employing a production method by ring-opening polymerization of lactide, the polymerization temperature is preferably from 140° to 210° C. In particular, the polymerization temperature may be from 150° to 180° C. from the viewpoint of preventing racemization of L-lactide and coloration upon decomposition.

Polylactic acids having a weight-average molecular weight of from 50,000 to 300,000 are obtained by polymerization. In the present specification, the term "weight-average molecular weight of the polylactic acid" refers to a weight-average molecular weight of only the polymer moiety in the GPC chromatogram.

Polymerization is performed by using one or more vertical reactors and stopped at a point where the polylactic acids still have a given level of fluidity. In other words, the polymerization is carried out and stopped while the polymers are in a fluidal state, because excessive increase of viscosity in the polylactic acid is undesirable from the viewpoint of handling. It is preferable to use a plurality of reactors equipped with impellers adapted to different viscosities, since the viscosity of polymer increases as polymerization progresses in the vertical reactors. Furthermore, in the case of continuous operation, a plurality of reactors are connected in series so as to make the distribution of retention time sharp and extend the area for heat transfer per volume. For example, a reactor equipped with a slanted impeller, a turbine impeller or a full zone impeller is used first to uniformly stir a catalyst in a low viscosity range. Next, a reactor equipped with an impeller adapted to high viscosity, such as a spiral ribbon impeller, is used for stirring. When a plurality of reactors are used, it is not always necessary to make the reaction temperatures of the reactors equal.

The catalysts used for polymerization may be any known catalysts conventionally usable for the polymerization of lactic acid. Examples thereof include tin compounds, such as tin octylate; titanium compounds, such as tetrapropyl titanate; zirconium compounds, such as zirconium isopropoxide; and antimony compounds, such as antimony trioxide. Also, the molecular weight of the final product polymer can be adjusted depending upon the amount of the catalyst added. Smaller the amount of the catalyst, higher the molecular weight, though the reactor rate becomes slower. Besides them, nucleating agents, such as talc, clay, and titanium oxide, may be added.

The lactide used for the method of the present invention may be a D-, L-, or DL-isomer, or a mixture of D- and L-isomers. The above monomer can also be copolymerized with lactones, such as $\beta$-propiolactone, $\delta$-valerolactone, $\epsilon$-caprolactone glycolide, and $\delta$-butyrolactones. Further, polyhydric alcohols, such as glycerol, may be used to control physical properties. The conditions for polymerization depend on the catalysts used. When tin octylate is used as the catalyst, polymerization may be carried out by heating the reaction mixture for 1.0 to 30 hours using the catalyst in an amount of preferably from 0.0001 to 0.1% by weight, more preferably from 0.001 to 0.05% by weight, based on the lactide. The reaction is preferably carried out in an atmosphere or stream of an inert gas, such as a nitrogen gas.

The resulting polymerized polylactic acid is pelletized into various forms, including disrupted pieces, rectangular chip-like forms, columns and marble forms, without being particularly limited thereto. Among them, a preference is given to columns and marble forms. Examples of the forming apparatuses used to produce above shapes include "STRIP FORMER," "ROTO FORMER," and "DOUBLE ROLL FEEDER" manufactured by SANDVIK; "ROTARY-TYPE DROP FORMER" and "PISTON-TYPE DROP FORMER" manufactured by Kaiser; "DRUM COOLER" manufactured by Mitsubishi Kasei Engineering; and "STEELBELT COOLER" and "HYBRID FORMER" manufactured by Nippon Belding. Although the sizes of the pellets are not particularly limited, from the viewpoint of the handling during the production process, such as bagging of the pellets, and the handling of the secondary forming, the sizes may preferably be such that each pellet weighs from 0.1 to 10 g, more preferably from 1 to 5 g, regardless of their shapes.

The resulting polylactic acid pellets are then crystallized. The crystallization is carried out in a state that high flowability of the polylactic acid pellets is maintained, so that the pellets are prevented from melting and adhering to each other owing to an excessive elevation of the temperature by generation of the heat of crystallization. In the crystallization, a jacket and/or a heated inert gas and/or heated air is used while providing flowability mechanically or by passing an inert gas therethrough, to keep the temperature between equal to or higher than the glass transition temperature of the polylactic acid pellets and equal to or lower than the melting point thereof for a given amount of time. Specifically, the heating temperature for crystallization may be from 55° to 180° C., preferably 80° to 120° C., and the heating time may be from 10 minutes to 5 hours, preferably from 1 to 2 hours. As for the apparatus mentioned above, known conical dryers may be usable. In cases where continuous operations are carried out, examples of apparatus include "TAURUS DISC" manufactured by Hosokawa Micron Corporation and "OTWK" and "OTWG" manufactured by BUHLER. These apparatus may be used in multiple steps in cases where the melting and adhering abilities of the pellets become high owing to molecular weights of the crystallized pellets, additives, and optical purity of a constituting unit, lactic acid.

Next, the low-molecular components in the crystallized pellets are gasified and removed from the pellets. The low-molecular components are removed using a jacket and/or a heated inert gas and/or heated air at a temperature between equal to or higher than the glass transition temperature of the polylactic acid pellets and equal to or lower than the melting point thereof for a given amount of time. Specifically, the heating temperature for removing the low molecular compounds may be from 100° to 180° C., preferably 120° to 140° C., and the heating time may be from 10 hours to 100 hours, preferably from 20 to 50 hours. The heating time may vary depending upon the amount of the low-molecular components to be removed, the degree of vacuum or amount of an inert gas and/or air passed, and the heating temperature. The apparatus usable in the removal of the low-molecular components may be a hollow, cylindrical reactor in cases of carrying out continuous operation, wherein the heated inert gas and/or heated air is passed through the bottom portion of the reactor to the upper portion and the pellets are fed from the upper portion of the reactor.

Differentiation of the operation of the crystallization from that of the removal of the low-molecular components are not always distinct, and it is possible to use a crystallizer only and simultaneously carry out removing of the low-molecular components by operating under appropriate temperature and reaction time conditions. The crystallizer and the device for removing the low-molecular components require different levels of fluidity of the pellets. Here, the crystallizer requires a notably high fluidity in the polylactic acid pellets, so that the pellets are prevented from melting and adhering to each other owing to an excessive elevation of the temperature by generation of the heat of crystallization. However, in cases of apparatus for industrial production, the high fluidity is only required for the crystallization process, so that it is economically more advantageous to use a simple hollow, cylindrical reactor for the process of removing the low-molecular components.

The resulting pellets from which the low-molecular components are removed are cooled to a temperature equal to or higher than the glass transition temperature of the polylactic acid pellets by passing the pellets through a cooling device, such as a hollow, cylindrical cooling device and then taking the pellets out from the apparatus. As for this cooling device, for instance, "TAURUS DISC" manufactured by Hosokawa Micron Corporation, in which the pellets are mechanically fluidized, may be usable. The polylactic acid obtained by the method of the present invention from which the low-molecular components are removed preferably has a weight-average molecular weight of from 100,000 to 500,000, wherein the resulting polylactic acid has an unchanged lactide component in an amount of 1.0% by weight or less. Here, the amount of the unchanged lactide component is measured as follows. Specifically, the pellets are impregnated over one day and night in acetonitrile, and the extract liquid is subjected to liquid chromatography measurement. The amount of the unchanged lactide component is calculated by absolute calibration method.

Here, the low-molecular components to be removed in the present invention mainly comprise unchanged lactide. The removed lactide is collected by such means as a cooling condenser, a cyclone, a filter, or a scrubber for lactic acid or melted lactide, and then subsequently reused as the starting material for polymerization, to give a polylactic acid. In a case where a condenser is used, the lactide may be captured by cooling and solidifying it, or the lactide may be captured in a liquid state, with a preference given to a method where the lactide is captured in a liquid state from the viewpoint of carrying out continuous operation.

One example of the apparatus for carrying out the removing step of the method for the present invention will be explained in detail below referring to the drawing.

FIG. 1 is a schematic view of one example of an apparatus for removing the low-molecular components. In the figure, 1 is a feeder comprising a hollow, cylindrical tank with two openings at top and bottom portions, the opening at the bottom portion having a switching valve (not illustrated in the figure).

To the bottom portion of the feeder 1, a crystallizer 2 is connected. The crystallizer 2 comprises a hollow, rectangular parallelepiped-shaped tank having a gas exhaust outlet "a" in its upper portion and a gas supplying inlet "b" in its bottom portion, through which a heated inert gas flows via a hopper-type reactor 3 for removing low-molecular components as detailed below.

By flowing an inert gas, such as a nitrogen gas, the temperature inside the crystallizer 2 is maintained between equal to or higher than the glass transition temperature of the polylactic acid pellets and equal to or lower than the melting point thereof (55° to 180° C.). In addition, the gas supplying inlet "b" also serves as a feeding inlet for feeding the crystallized pellets to the hopper-type reactor 3. In other words, the pellets are dropped from the feeding inlet by a gravitational force, and hence only the inert gas is supplied from the gas supplying inlet.

The hopper-type reactor 3 is a hollow, cylindrical reactor, which has a gas supplying inlet "c" and a gas exhaust outlet "d" as in the crystallizer 2, through which the heated inert gas flows. This inert gas is supplied from a gas source 11 and flows into the gas supplying inlet "c" of the hopper-type reactor 3 after passing through a condenser 6 and a heater 7. Here, the inert gas is heated to a given temperature at the heater 7. A flow path 10 of the inert gas is shown by a broken line in the figure, the inert gas sequentially flowing in the following directions: The gas source 11→the condenser 6→the heater 7→the gas supplying inlet "c" →the hopper-type reactor 3→the gas exhaust outlet "d" →the gas supplying inlet "b" →the crystallizer 2→the gas exhaust outlet "a" →the condenser 6. Thereafter, the inert gas in the condenser is exhausted outside of the apparatus. In the condenser 6, an inert gas containing gaseous, low-molecular components exhausted from the gas exhaust outlet "a" is cooled, to thereby liquefy or solidify the low-molecular components and remove them from the apparatus. The inert gas is then reheated by the heater 7 to be circulated for reuse, and an amount equivalent to that exhausted from the apparatus is newly added from the gas source 11.

In addition, the gas exhaust outlet "d" also serves as a feeding inlet for feeding the crystallized pellets to the hopper-type reactor 3. Also, a control valve 12 is provided at the bottom portion of the hopper-type reactor 3.

A hollow, cylindrical cooling device 4 is connected to the bottom portion of the hopper-type reactor 3. In the cooling device 4, the resulting polylactic acid pellets, from which the low-molecular components are removed in the reactor 3, are cooled to be taken out as a product 5. Here, the cooling device 4 comprises a vessel provided with cooling water in the periphery thereof to cool the vessel by circulating the cooling water. In addition, a control valve 13 is provided at the bottom portion of the cooling device 4.

Using the apparatus having the above construction, the removal of the low-molecular components from the polylactic acid pellets is carried out, for instance, by the following method.

First, the polylactic acid pellets are fed to the feeder 1, and the switching valve arranged at the opening in the bottom portion of the feeder is opened to continuously feed the polylactic acid pellets into the crystallizer 2. In the crystallizer 2, the heated inert gas flows into the crystallizer 2 from the gas supplying inlet "b," the polylactic acid pellets are crystallized by heat supplied therefrom. The crystallized polylactic acid pellets are then fed to the hopper-type reactor 3. At this time, the control valve 12 of the hopper-type reactor 3 is closed, so that the crystallized pellets are kept inside the reactor 3 for a given amount of time. Since the heated inert gas is supplied to the reactor 3, the polylactic acid pellets are heated and thereby the low molecular components, such as lactide alone, are removed from the heated pellets by gasification. The gaseous low-molecular components removed from the polylactic acid components then flow in the following directions: The gas exhaust outlet "d" →the gas supplying inlet "b" →the crystallizer 2→the gas exhaust outlet "a" →the condenser 6→outside the apparatus. Here, the gasified and removed low-molecular components are cooled by the condenser 6 to be liquefied and discharged from the apparatus (See arrow 9 of the figure). Since the discharged, low-molecular components mainly comprises lactide, they can be reused for polymerization.

After subjecting the starting polylactic acid pellets to a treatment for a given amount of treatment time in the reactor 3, the resulting polylactic acid pellets free from the low-molecular components are fed to the cooling device 4. The polylactic acid pellets cooled to a temperature near room temperature in the cooling device 4 are then taken out as the product 5 from the control valve 13.

The above process is continuously carried out. In other words, the polylactic acid is continuously fed from the feeder 1 and continuously taken out from the control valve 13. The treatment time mentioned herein refers to an average retention time inside the reactor.

Incidentally, in the above explanation, heating of the crystallizer 2 and the hopper-type reactor 3 is conducted by passing an inert gas through these devices, but the present invention is not limited thereto. For example, the above heating means used as heaters may be arranged in each of the devices. Further, the crystallization and the removal of the low-molecular components may be carried out in the crystallizer 2 without using a hopper-type reactor 3.

By using the method for removing low-molecular components of the present invention, the polylactic acid pellets substantially containing no low-molecular components and having excellent moldability can be produced. Therefore, the polylactic acid pellets treated by the method of the present invention have excellent formabilities of films, fibers, and injection molding products.

EXAMPLES

The method of the present invention was verified according to the following experiment examples.

Molecular weights determined by GPC, amounts of unchanged lactide, glass transition temperatures, and MFR (melt flow rate) in each of the following Experimental Examples were analyzed under the following conditions:

<Measurement of Molecular Weight: GPC Measurement>
Detector: RID-6A
Pump: LC-9A
Column oven: CTO-6A
Columns: Connecting in series: SHIM PACK GPC-801C, GPC-804C, GPC-806C, and GPC-8025C.
Here, the detector, the pump, the column oven, and the columns were all manufactured by Shimadzu Corporation.
Analysis conditions:
Solvent: Chloroform
Flow rate: 1 ml/min
Amount of sample: 200 $\mu$l (dissolving concentration of 0.5% by weight in chloroform)
Column temp.: 40° C.

<Measurement of Amounts of Unchanged Lactide>
The samples were impregnated over one day and night in acetonitrile, and the extract liquid was subjected to liquid chromatography measurement under the following conditions, and the amount was calculated by absolute calibration curve method.
Detector: SPD-6AV (UV 210 nm)
Pump: LC-9A
Column oven: CTO-6A
Columns: ASAHIPAC GF-7MHQ (7.6 mmID, 300 MML)
Here, the detector, the pump, the column oven, and the columns were all manufactured by Shimadzu Corporation.
Analysis conditions:
Solvent: Acetonitrile
Flow rate: 0.6 ml/min
Amount of sample: 10 $\mu$l <Measurement of Glass Transition Temperature>
In accordance with the method of JIS K 7121, a mid-point glass transition temperature was obtained.

<Measurement of MFR (Melt Flow Rate)>

Measured by the method of JIS K 7120.

Experimental Example 1

(Starting Material)

Fifty kilograms of lactide (manufactured by Shimadzu Corporation) was placed in 50/vertical reactor equipped with "LOGHORN IMPELLER" (manufactured by Shinko Pantec), and the contents were dissolved at 110° C. while the agitator was rotated at 60 r.p.m. Thereafter, 10 ppm of tin octylate was added to the above solution, and the mixture was allowed to react at 160° C. for 47 hours. At this time, the polylactic acid had a weight-average molecular weight of 193,000 and a glass transition temperature of 40.1° C., and contained residual unchanged lactide in an amount of 12% by weight. This polylactic acid was formed into rectangular pellets with dimensions of 4 mm×4 mm×1 mm by using a drum cooler "DC450" manufactured by Mitsubishi Kasei Engineering.

(Removal of Low-Molecular Components)

Using "TAURUS DISC, 12-3 Type" manufactured by Hosokawa Micron Corporation (heat conduction area: 1.9 m$^2$) as a device for crystallizing polylactic acids and removing low-molecular components, 20 kg of the above pellets were placed in the device, and a nitrogen gas at 140° C. was passed through at a rate of 200 NL/min for 36 hours. The rotation speed of the disc was 30 r.p.m. The resulting polylactic acid contained the residual unchanged lactide in a remarkably small amount of 970 ppm, and had a glass transition temperature of 60.5° C., a weight-average molecular weight of 156,000, and a melt flow rate (MFR) of 4.18.

Experimental Example 2

(Starting Material)

Fifty kilograms of lactide (manufactured by Shimadzu Corporation) was placed in 50/vertical reactor equipped with "LOGHORN IMPELLER" (manufactured by Shinko Pantec), and the contents were dissolved at 110° C. while the agitator was rotated at 60 r.p.m. Thereafter, 10 ppm of tin octylate was added to the above solution, and the mixture was allowed to react at 160° C. for 47 hours. At this time, the polylactic acid had a weight-average molecular weight of 193,000 and a glass transition temperature of 40.1° C., and contained residual unchanged lactide in an amount of 12% by weight. This polylactic acid was formed into rectangular pellets with dimensions of 4 mm×4 mm×1 mm by using a drum cooler "DC450" manufactured by Mitsubishi Kasei Engineering.

(Removal of Low-Molecular Components)

"TAURUS DISC, 12-3 Type" manufactured by Hosokawa Micron Corporation (heat conduction area: 1.9 m$^2$) used as a crystallizer was connected at its outlet side to a hollow, cylindrical hopper-type reactor having an inner diameter of 35 cm and a length of 230 cm. Further, a hollow, cylindrical hopper-type cooling device having an inner diameter of 35 cm and a length of 100 cm was serially connected thereto. Using two electric heaters each having a 2.5 kW capacity, a nitrogen gas at 200 NL/min was heated to 140° C., and then the heated nitrogen gas was passed through the bottom portion of the hopper-type reactor and to the crystallizer. The rotational speed of the discs in the crystallizer was 30 r.p.m. The pellets were fed from the inlet of the crystallizer through the feeder continuously at a rate of 5 kg/hour. The temperature inside the cooling device was maintained to a temperature of equal to or lower than 30° C. by means of cooling water.

The lactide removed above was captured by a condenser having a conducting area of 3 m$^2$. The captured lactide was in a liquid state, which was then reused for polymerization without showing deficiency in their quality. Here, the cooling temperature of the condenser was 100° C. Also, the nitrogen gas was circulated for reuse.

The resulting polylactic acid contained the residual unchanged lactide in a remarkably small amount of 850 ppm, and had a glass transition temperature of 61.5° C., a weight-average molecular weight of 166,000, and a melt flow rate (MFR) of 4.20.

Experimental Example 3

The same procedures as in Experimental Example 2 were carried out except for lowering the temperature of the condenser to 20° C. to solidify the lactide in the condenser. The nitrogen gas was similarly circulated for reuse. Although the properties of the resulting product were substantially the same as that obtained in Experimental Example 2, the temperature of the condenser was required to be raised to 120° C. in order to melt the solidified lactide.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a polylactic acid having 1.0% by weight or less of low-molecular weight components, comprising the steps of:

(a) producing polylactic acid pellets by direct polymerization of lactic acid or ring-opening polymerization of lactide;

(b) crystallizing the polylactic acid pellets; and (c) removing from the resulting crystallized, solid polylactic acid pellets low-molecular weight components having a weight-average molecular weight of 1,000 or less by sublimating the low-molecular weight components.

2. The method according to claim 1, wherein the step (c) is carried out by allowing a heated inert gas and/or heated air to pass through the crystallized, solid polylactic acid pellets.

3. The method according to claim 1, wherein said crystallized, solid polylactic acid pellets obtained in step (b) have a weight-average molecular weight of from 50,000 to 300,000.

4. The method according to claim 1, wherein the polylactic acid after removing the low-molecular components in step (c) has a weight-average molecular weight of from 100,000 to 500,000.

5. The method according to claim 1, wherein the polylactic acid after removing the low-molecular components in step (c) contains unchanged lactide in an amount of 1.0% by weight or less.

6. The method according to claim 1, further comprising the steps of:

(d) collecting the removed low-molecular weight components obtained in step (c); and (e) reusing the removed low-molecular weight components as a starting material in a polymerization step for producing polylactic acids.

7. The method of claim 2 further comprising a heating temperature of 100°–180° C.

8. The method of claim 2 further comprising a heating time of 10–100 hours.

9. The method of claim 1 wherein steps (b) and (c) are carried out simultaneously.

10. The method of claim 2 wherein step (c) is carried out under atmospheric pressure.

* * * * *